(12) United States Patent
Yuan et al.

(10) Patent No.: US 12,060,469 B2
(45) Date of Patent: *Aug. 13, 2024

(54) ANTI-POWDERING AND ANTI-STATIC POLYMER FILM FOR DIGITAL PRINTING

(71) Applicant: MITSUBISHI POLYESTER FILM, INC, Greer, SC (US)

(72) Inventors: Zhongzhe Yuan, Boiling Springs, SC (US); Daniel Jacober, Hendersonville, NC (US)

(73) Assignee: MITSUBISHI CHEMICAL AMERICA, INC., Greer, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/339,010

(22) Filed: Jun. 4, 2021

(65) Prior Publication Data

US 2021/0292500 A1    Sep. 23, 2021

Related U.S. Application Data

(63) Continuation of application No. 14/542,993, filed on Nov. 17, 2014, now Pat. No. 11,028,299.

(Continued)

(51) Int. Cl.
  C08J 7/043   (2020.01)
  C08J 7/04    (2020.01)
  (Continued)

(52) U.S. Cl.
  CPC ............. *C08J 7/043* (2020.01); *C08J 7/0427* (2020.01); *C08J 7/044* (2020.01); *C08J 7/046* (2020.01);
  (Continued)

(58) Field of Classification Search
  None
  See application file for complete search history.

(56) References Cited

U.S. PATENT DOCUMENTS 3,446,651 A    5/1969   Clachan et al.
3,563,942 A    2/1971   Heiberger
(Continued)

FOREIGN PATENT DOCUMENTS

CN    101781511 A  *  7/2010
EP    0782932         7/1997
(Continued)

OTHER PUBLICATIONS

"ASTM-D257 Standard Test Methods for DC Resistance." (May 2007). (Year: 2007).
(Continued)

*Primary Examiner* — Vivian Chen
(74) *Attorney, Agent, or Firm* — Dority & Manning, P.A.

(57) ABSTRACT

A coated polymer film, such as a coated polyester film, is disclosed. In one embodiment, the coated film may be used as a substrate for digital printing. In one embodiment, the coating contains an anionic anti-static agent comprising a sulphonated copolyester resin. In an alternative embodiment, the coating contains an anti-static agent comprising an organometallic, such as an organo zirconate, in combination with metal oxide particles. The metal oxide particles may comprise nanoparticles. In one embodiment, the coating can further contain a print enhancing agent and an adhesion promoter.

21 Claims, 1 Drawing Sheet

Related U.S. Application Data

(60) Provisional application No. 61/984,348, filed on Apr. 25, 2014, provisional application No. 61/906,121, filed on Nov. 19, 2013.

(51) Int. Cl.

| | |
|---|---|
| C08J 7/044 | (2020.01) |
| C08J 7/046 | (2020.01) |
| C08K 3/013 | (2018.01) |
| C08K 3/017 | (2018.01) |
| C08K 3/22 | (2006.01) |
| C08K 3/26 | (2006.01) |
| C08K 3/30 | (2006.01) |
| C08K 5/00 | (2006.01) |
| C08K 5/06 | (2006.01) |
| C08K 5/3492 | (2006.01) |
| C09D 5/24 | (2006.01) |
| C09D 123/00 | (2006.01) |
| C09D 123/08 | (2006.01) |
| C09D 129/10 | (2006.01) |
| C09D 133/12 | (2006.01) |
| C09D 161/00 | (2006.01) |
| C09D 161/20 | (2006.01) |
| C09D 161/26 | (2006.01) |
| C09D 161/28 | (2006.01) |
| C09D 167/00 | (2006.01) |
| C09D 167/02 | (2006.01) |
| C09D 167/03 | (2006.01) |
| C09D 171/00 | (2006.01) |
| C09J 123/00 | (2006.01) |
| C09J 123/08 | (2006.01) |
| C09J 129/00 | (2006.01) |
| C09J 133/12 | (2006.01) |
| C09J 161/00 | (2006.01) |
| C09J 161/20 | (2006.01) |
| C09J 161/26 | (2006.01) |
| C09J 161/28 | (2006.01) |
| C09J 167/00 | (2006.01) |
| C09J 167/02 | (2006.01) |
| C09J 167/03 | (2006.01) |
| C09J 171/00 | (2006.01) |
| C09K 3/16 | (2006.01) |

(52) U.S. Cl.
CPC ......... *C09D 129/10* (2013.01); *C09D 167/02* (2013.01); *C09K 3/16* (2013.01); *C08K 3/013* (2018.01); *C08K 3/017* (2018.01); *C08K 3/22* (2013.01); *C08K 2003/222* (2013.01); *C08K 2003/2237* (2013.01); *C08K 2003/2241* (2013.01); *C08K 2003/2244* (2013.01); *C08K 2003/265* (2013.01); *C08K 2003/3045* (2013.01); *C08K 5/0025* (2013.01); *C08K 5/06* (2013.01); *C08K 5/34922* (2013.01); *C09D 5/24* (2013.01); *C09D 123/00* (2013.01); *C09D 123/08* (2013.01); *C09D 123/0846* (2013.01); *C09D 123/0869* (2013.01); *C09D 123/0876* (2013.01); *C09D 133/12* (2013.01); *C09D 161/00* (2013.01); *C09D 161/20* (2013.01); *C09D 161/26* (2013.01); *C09D 161/28* (2013.01); *C09D 167/00* (2013.01); *C09D 167/03* (2013.01); *C09D 171/00* (2013.01); *C09J 123/00* (2013.01); *C09J 123/08* (2013.01); *C09J 123/0846* (2013.01); *C09J 123/0869* (2013.01); *C09J 123/0876* (2013.01); *C09J 129/00* (2013.01); *C09J 133/12* (2013.01); *C09J 161/00* (2013.01); *C09J 161/20* (2013.01); *C09J 161/26* (2013.01); *C09J 161/28* (2013.01); *C09J 167/00* (2013.01); *C09J 167/02* (2013.01); *C09J 167/03* (2013.01); *C09J 171/00* (2013.01); *Y10T 428/249991* (2015.04); *Y10T 428/25* (2015.01); *Y10T 428/256* (2015.01); *Y10T 428/258* (2015.01); *Y10T 428/265* (2015.01); *Y10T 428/31786* (2015.04); *Y10T 428/31797* (2015.04)

(56) References Cited

U.S. PATENT DOCUMENTS

| | | | |
|---|---|---|---|
| 3,779,993 A | 12/1973 | Kibler et al. | |
| 4,242,412 A | 12/1980 | Funaki | |
| 4,252,885 A | 2/1981 | McGrail | |
| 4,375,494 A | 3/1983 | Stokes | |
| 4,415,626 A | 11/1983 | Hasenauer | |
| 4,476,189 A | 10/1984 | Posey | |
| 4,493,872 A | 1/1985 | Funderburk et al. | |
| 4,525,419 A | 6/1985 | Posey | |
| 4,585,687 A | 4/1986 | Posey | |
| 4,711,816 A | 12/1987 | Wittnebel | |
| 4,715,968 A * | 12/1987 | Sugerman | C08K 5/0091 252/519.21 |
| 4,745,019 A | 5/1988 | Posey | |
| 4,861,512 A | 8/1989 | Gosslink | |
| 4,876,155 A | 10/1989 | Thoese | |
| 4,903,039 A | 2/1990 | Light | |
| 4,908,277 A | 3/1990 | Tsunashima | |
| 4,996,135 A | 2/1991 | Toyama et al. | |
| 5,075,153 A | 12/1991 | Malhotra | |
| 5,104,721 A | 4/1992 | Sun | |
| 5,262,224 A | 11/1993 | Ozaki | |
| 5,277,965 A | 1/1994 | Malhotra | |
| 5,350,601 A | 9/1994 | Culbertson et al. | |
| 5,395,677 A * | 3/1995 | Harada | G03G 7/0053 428/323 |
| 5,418,042 A | 5/1995 | Thirtle | |
| 5,425,995 A | 6/1995 | Unruh | |
| 5,427,835 A | 6/1995 | Morrison | |
| 5,430,111 A | 7/1995 | Recchia | |
| 5,478,631 A * | 12/1995 | Kawano | B41M 5/5245 428/323 |
| 5,508,343 A * | 4/1996 | Holley | C08K 5/0075 524/910 |
| 5,609,969 A | 3/1997 | Clatanoff | |
| 5,624,743 A | 4/1997 | Malhotra | |
| 5,659,058 A * | 8/1997 | Monte | C08K 5/17 525/274 |
| 5,677,067 A | 10/1997 | Kojima | |
| 5,789,123 A * | 8/1998 | Cleckner | G03G 7/004 428/326 |
| 5,811,197 A | 9/1998 | Nishiyama | |
| 5,827,627 A | 10/1998 | Cleckner | |
| 5,908,688 A * | 6/1999 | Okada | C09K 3/16 428/323 |
| 5,925,447 A | 7/1999 | Gust et al. | |
| 5,989,686 A | 11/1999 | Song | |
| 6,017,610 A * | 1/2000 | Abe | B32B 7/025 428/411.1 |
| 6,020,412 A | 2/2000 | Muschelewicz et al. | |
| 6,051,355 A | 4/2000 | Van Thillo | |
| 6,059,998 A | 5/2000 | Unruh | |
| 6,096,443 A | 8/2000 | Malhotra | |
| 6,103,368 A | 8/2000 | Fukuda | |
| 6,121,382 A * | 9/2000 | Chang | B41M 5/52 524/436 |
| 6,143,408 A | 11/2000 | Fujita | |
| 6,153,289 A | 11/2000 | Murray | |
| 6,194,061 B1 | 2/2001 | Satoh | |
| 6,214,440 B1 | 4/2001 | Peiffer et al. | |
| 6,358,604 B1 | 3/2002 | Peiffer et al. | |
| 6,387,481 B1 | 5/2002 | Matsuzaki | |
| 6,436,183 B1 | 8/2002 | Amirzadeh | |

(56) References Cited

U.S. PATENT DOCUMENTS

| | | |
|---|---|---|
| 6,455,142 B1 | 9/2002 | Heberger et al. |
| 6,607,808 B2 | 8/2003 | Peiffer et al. |
| 6,607,823 B2 | 8/2003 | Possey et al. |
| 6,617,035 B2 | 9/2003 | Peiffer et al. |
| 6,627,295 B2 | 9/2003 | Peiffer et al. |
| 6,635,356 B2 | 10/2003 | Miki et al. |
| 6,663,956 B2 | 12/2003 | Herberger et al. |
| 6,706,389 B1 | 3/2004 | Bates |
| 6,808,863 B2 | 10/2004 | Kita |
| 6,855,758 B2 | 2/2005 | Murschall et al. |
| 6,872,461 B2 | 3/2005 | Murschall et al. |
| 6,893,706 B2 | 5/2005 | Peiffer et al. |
| 7,056,573 B2 | 6/2006 | Murschall et al. |
| 7,081,324 B1 | 7/2006 | Hare et al. |
| 7,122,239 B2 | 10/2006 | Bennett et al. |
| 7,279,513 B2 | 10/2007 | Zhang |
| 7,364,800 B2 | 4/2008 | Jesberger et al. |
| 7,427,435 B2 | 9/2008 | Possey |
| 7,550,518 B2 | 6/2009 | Bredt et al. |
| 7,858,161 B2 | 12/2010 | Nair et al. |
| 11,028,299 B2 * | 6/2021 | Yuan ............... C08J 7/046 |
| 2001/0028944 A1 | 10/2001 | Fujimoto |
| 2002/0016440 A1 | 2/2002 | Louwet |
| 2002/0064650 A1 | 5/2002 | Masuda |
| 2002/0136880 A1 | 9/2002 | Murschall |
| 2002/0142141 A1 | 10/2002 | Miller |
| 2002/0146637 A1 | 10/2002 | Nakajima |
| 2002/0150732 A1 | 10/2002 | Sarkar |
| 2003/0035944 A1 | 2/2003 | Blackwell |
| 2003/0124367 A1 * | 7/2003 | George ............... C08G 63/672 |
| | | 428/480 |
| 2003/0138607 A1 | 7/2003 | Kuroki |
| 2003/0207094 A1 | 11/2003 | Carls |
| 2005/0019360 A1 | 1/2005 | Ballinger |
| 2005/0058846 A1 | 3/2005 | Matsui |
| 2005/0100751 A1 | 5/2005 | Nishizawa |
| 2006/0275593 A1 | 12/2006 | Kern |
| 2007/0003777 A1 | 1/2007 | Iwasa |
| 2007/0087188 A1 | 4/2007 | Konrad |
| 2007/0092695 A1 | 4/2007 | Jesberger |
| 2007/0134470 A1 * | 6/2007 | Jesberger ............... C08K 3/22 |
| | | 428/323 |
| 2007/0218291 A1 | 9/2007 | Chiou |
| 2007/0240075 A1 | 10/2007 | Jesberger |
| 2008/0075847 A1 | 3/2008 | Kobayashi |
| 2008/0182200 A1 | 7/2008 | Kim |
| 2008/0249226 A1 | 10/2008 | Shieh |
| 2008/0311385 A1 * | 12/2008 | Miyazaki ............... B32B 27/20 |
| | | 524/539 |
| 2009/0075191 A1 | 3/2009 | Kim |
| 2010/0291363 A1 | 11/2010 | Koike |
| 2010/0304127 A1 * | 12/2010 | Jeong ............... B32B 27/20 |
| | | 428/688 |
| 2012/0002397 A1 | 1/2012 | Iwata et al. |
| 2012/0088044 A1 | 4/2012 | Simpson |
| 2012/0128945 A1 | 5/2012 | Yabuta |
| 2012/0148768 A1 | 6/2012 | Simpson |
| 2012/0315465 A1 | 12/2012 | Kawasaki |
| 2013/0004710 A1 | 1/2013 | Kawasaki |
| 2013/0017397 A1 | 1/2013 | Kouda et al. |
| 2013/0009525 A1 | 4/2013 | Hiraki et al. |

FOREIGN PATENT DOCUMENTS

| | | |
|---|---|---|
| EP | 0823676 | 2/1998 |
| JP | 02269179 | 11/1990 |
| JP | 03124762 | 5/1991 |
| JP | 03215550 | 9/1991 |
| JP | 04248843 | 9/1992 |
| JP | 07149934 | 6/1995 |
| JP | 09157371 | 6/1997 |
| JP | 09279025 | 10/1997 |
| WO | WO9413484 | 6/1994 |
| WO | WO2008120465 | 10/2008 |

OTHER PUBLICATIONS

International Search Report and Written Opinion for PCT/US2014/066029, dated Jun. 2, 2015, 19 pages.

"Difference Between Conductive, Dissipative, Insulative and Antistatic" (http://transforming-technologies.com/esd-fyi/ difference-between-conductive-dissipative-and-insulative/) (Mar. 2012) (Year: 2012).

"ESD vs Anti-Static vs Dissipative vs Conductive vs Insulative." (http://blog.all-spec.com/2007/07/esd-vs-anti-static-vs-dissipative-vs-conductive-vs-insulative/) (Jul. 2007) (Year: 2007).

Material Safety Data Sheet, Synthesize AJ100-30, Momentive, Version 2.0, Date of Issue Aug. 8, 2013, 9 pages.

PCI Magazine: "2012 Additives Handbook", Jun. 1, 2012 (Jun. 1, 2012), pp. 2-170, XPO55172212, Retrieved from the Internet: URL:http://www.pcimag.com/articles/97893-additives-handbook [Retrieved on Feb. 26, 2015].

Synthesize PE-100, Momentive, 1 page.

"Wikipedia—Electrostatic discharge materials" (https://en.wikipedia.org/wiki/Electrostatic_discharge_materials) (webpage retrieved Jan. 4, 2019) (Year: 2019).

"Wikipedia—Electrical resistivity and conductivity" (https://en.wikipedia.org/wiki/Electrical_resistivity_and_conductivity) (webpage retrieved Jan. 5, 2019) (Year: 2019).

* cited by examiner

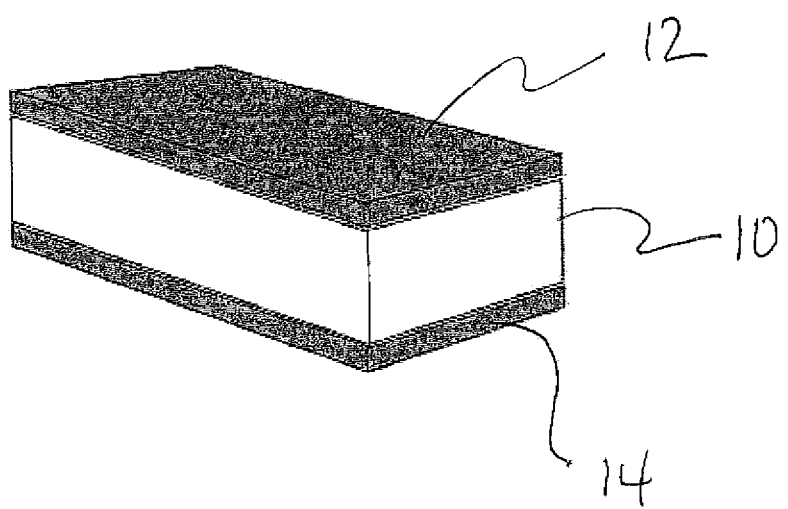

ANTI-POWDERING AND ANTI-STATIC POLYMER FILM FOR DIGITAL PRINTING

RELATED APPLICATIONS

The present application is a continuation of U.S. patent application Ser. No. 14/542,993 filed on Nov. 17, 2014, which is based on and claims priority to U.S. Provisional Patent application Ser. No. 61/984,348 filed on Apr. 25, 2014 and U.S. Provisional Patent application Ser. No. 61/906,121 filed on Nov. 19, 2013, which are incorporated herein by reference.

BACKGROUND

Polyester films, such as biaxially stretched films containing polyethylene terephthalate, are used in numerous applications. For instance, the films are widely used as a base for photographic film, reprographic film, and the like. Polyester films are also well known for use in packaging, in labeling applications, and as a release liner.

In the past, various problems and difficulties have been faced by those skilled in the art when attempting to apply graphics or lettering to polyester films. For instance, polyester films are typically hydrophobic and therefore not readily receptive to many inks and pigments. Consequently, in order to use polyester films in printing applications, the films typically were first coated with a primer coating. In the past, various different types of primer coatings have been suggested. For instance, PCT Publication No. WO94/13481 discloses a copolyester film coated on one or both sides with vinyl acetate polymers.

In the relatively recent past, the use of digital printers has escalated as the cost and size of digital printers has decreased. Digital printing typically refers to the use of laser printers and inkjet printers in order to deposit a pigment, such as a toner, onto a substrate. Digital printers typically apply pigments or toner to a substrate without contacting the substrate. The pigment or toner typically does not become absorbed or impregnated into the substrate but, instead, forms a thin layer on the surface.

With the rapid increase in the use of digital printers, those skilled in the art have attempted to develop a coated polyester film that is capable of receiving printed matter from a digital printer. Designing a polymer film for a digital printer, however, presents a unique set of problems. For instance, in order to use a polymer film in a digital printing process, the film should have excellent anti-static properties. The buildup of a static charge within the polymer film, for instance, can cause the sheets to stick together especially when exiting the printer or feeding to a slitter. Static charges can also interfere with the proper operation of the printing device.

When used in a digital printing process, polymer films should also not generate dust. For example, as the polymer film is fed through a digital printer, the film comes in contact with at least one guide bar and at least one stationary drum. Contact with the stationary parts of the machine can cause either the coating to scratch off or cause the printed matter to streak. If the coating begins to rub or scratch off during use, the generated particles can get onto the electrostatic drums and leave white spots in the printed product. Consequently, the coating should not only be scratch resistant and adhere well to the base polymer film, but should also adhere well to the pigment or toner.

SUMMARY

In general, the present disclosure is directed to a coated polymer film, and particularly to a coated polyester film, that is well suited for receiving printed matter. In one embodiment, for instance, the coated film may be used as a substrate in a digital printing process. As will be described in greater detail below, the film not only has excellent anti-static properties, but produces low amounts of dust during use and adheres well to inks and pigments, including toner.

In one embodiment, the present disclosure is directed to a coated film comprising a base film having a first side and a second side. A coating is adhered to the first side of the film. The coating comprises an anti-static agent. The coating further contains a print enhancing agent, an adhesion promoter, or a mixture of both a print enhancing agent and an adhesion promoter. Optionally, the coating can also contain a crosslinking agent and an anti-slip agent.

In one embodiment, the anti-static agent comprises an anionic copolyester, such as a sulphonated copolyester, such as a copolyester polymer comprising 1,3-benzenedicarboxylic acid, 5-sulfo-,1,3-dimethylester, sodium salt, polymer with dimethyl 1,4-benzenedicarboxylate, 1,2-ethanediol and 2,2'-oxybis[ethanol].

In one particular embodiment, the coating contains the anionic anti-static agent in an amount from about 20% to about 40% by weight, a print enhancing agent in an amount from about 10% to about 35% by weight, and an adhesion promoter in an amount from about 20% to about 55% by weight.

In another embodiment, the present disclosure is directed to a coated film comprising a base film having a first side and a second side. A coating is adhered to the first side of the film. The coating comprises an anti-static agent, a print enhancing agent, an adhesion promoter, a crosslinking agent, metal oxide particles, and optionally an anti-slip agent.

In the above embodiment, the anti-static agent comprises a zirconate, such as an amino zirconate, a sulfonyl zirconate, or mixtures thereof. The anti-static agent may be present in the coating in an amount from about 10% to about 35% by weight, such as in an amount from about 15% to about 30% by weight, such as in an amount from about 15% to about 20% by weight.

The print enhancing agent may comprise a polyvinyl alkyl ether. The print enhancing agent may be present in the coating in an amount from about 10% to about 30% by weight, such as in an amount from about 15% to about 25% by weight. The adhesion promoter may comprise an alkylene acrylic acid copolymer. The adhesion promoter may be present in the coating in an amount from about 20% to about 40% by weight, such as in an amount from about 25% to about 35% by weight. The crosslinking agent, in one embodiment, may comprise a melamine.

As described above, the coating can further contain metal oxide particles. The metal oxide particles may comprise alumina particles, silica particles, or mixtures thereof. In one embodiment, the metal oxide particles can have an average particle size of less than about 100 nanometers, such as less than about 50 nanometers, such as less than about 10 nanometers. In one embodiment, at least 90% of the metal oxide particles have an average particle size of less than about 10 nanometers, such as less than about 5 nanometers.

Optionally, the coating can contain an anti-slip agent comprising particles. In one embodiment, the anti-slip agent may comprise polymethylmethacrylate particles having an average particle size of from about 1 micron to about 10 microns. The anti-slip agent may be present in an amount from about 0.5% to about 3% by weight of the coating.

The base film that is coated in accordance with the present disclosure, in one embodiment, may comprise a polyester film. For instance, the film may comprise a polyethylene terephthalate film. The film can be stretched in at least one direction. For instance, the film may have been biaxially stretched while the coating was applied and dried. The coating as described above can be applied to one side of the film or to both sides of the film.

In one particular embodiment, the base film comprises a polyester film containing a white pigment. The white pigment may be present in the film in an amount from about 5% to about 30% by weight.

The present disclosure is also directed to a process for producing a coated film by applying a coating composition to at least one side of a film layer. The coating composition can comprise the components described above. The coating composition can be applied before or during stretching of the film and dried.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which:

FIG. 1 is a perspective view of one embodiment of a coated film made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a coated polymer film and to a coating composition for a polymer film. The coating in accordance with the present disclosure provides the film with anti-dusting and/or anti-static properties. The coating also not only has enhanced adhesion to the polymer film substrate, but also displays enhanced adhesion to pigments, including dry toner.

Coated polymer films made in accordance with the present disclosure have many uses and applications. Of particular advantage, the coated film is well suited for accepting graphics and lettering from digital printers, including inkjet printers, laser printers, copiers, and the like. When used in digital printing applications, the coated polymer film of the present disclosure not only displays excellent adhesion to dry toner, but has excellent digital printability, high mechanical strength, and produces little to no dust.

Various different embodiments of coated polymer films in accordance with the present disclosure are described below. In one embodiment, the coating composition applied to the polymer film comprises an anti-static agent in combination with at least one of a print enhancing agent or an adhesion promoter. In one embodiment, the coating composition comprises the anti-static agent, a print enhancing agent, an adhesion promoter, a crosslinking agent, and an anti-slip agent.

In an alternative embodiment, the coating composition applied to the polymer film comprises an anti-static agent, a print enhancing agent, a crosslinking agent, an adhesion promoter, metal oxide particles, and optionally an anti-slip agent.

The coating compositions may comprise an aqueous dispersion that includes water as a carrier. The coating composition can be applied to one side of a base film or may be applied to both sides of a base film. The base film can be made from any suitable polymer.

Referring to FIG. 1, for instance, one embodiment of a coated film made in accordance with the present disclosure is shown. In FIG. 1, a cross-sectional view of the coated film is illustrated. The coated film includes a base film 10 made from a polymer. The base film 10, for instance, may be made from a polyester polymer. As shown, in this embodiment, the base film 10 is coated on both sides with a coating 12 and 14. The coating 12 and 14 is made in accordance with the present disclosure and is particularly well suited for receiving a pigment, such as a toner from a digital printer including a copier. In accordance with the present disclosure, the coating 12 and 14 has excellent anti-static and anti-dusting properties. When measured by a Simco FMX electrostatic meter, the coated film can have a static charge reading of from about −1 KV to about −20 KV. The coated surface of the film can also have a surface conductivity of zero. As used herein, surface conductivity can be measured using a Keithly Model 6487 Picoammeter. The coating is also scratch resistant and does not produce dust when fed through digital printers.

In one embodiment, the base film comprises a polyester film. In one particular embodiment, the base film may comprise a white matte film. For instance, the base film may comprise a polymer combined with a white pigment.

The base polymer film may generally have a thickness of from about 50 microns to about 400 microns, such as from about 50 microns to about 200 microns. The thickness of the coating, on the other hand, may be from about 80 nm to about 250 nm, such as from about 130 nm to about 200 nm.

As described above, the coating composition of the present disclosure generally contains at least one anti-static agent. In one embodiment, the anti-static agent may comprise a copolyester polymer, such as an anionic copolyester polymer. In an alternative embodiment, the anti-static agent may comprise an organo titanate and/or an organo zirconate. In still another embodiment, the coating composition may comprise a combination of a copolyester, an organo titanate, and/or an organo zirconate.

In one embodiment, the anionic antistatic agent is a polymer having a Chemical Abstract Name of 1,3-benzenedicarboxylic acid, 5-sulfo-, 1,3-dimethyl ester, sodium salt, polymer with dimethyl 1,4-benzenedicarboxylate, 1,2-ethanediol and 2,2'-oxybis[ethanol]. The molecular formula of this polymer is $(C_{10}H_{10}O_7S \cdot C_{10}H_{10}O_4 \cdot C_4H_{10}O_3 \cdot C_2H_6O_2 \cdot Na)_x$. The above copolyester may contain any suitable catalyst, such as an antimony catalyst or a titanium catalyst.

In an alternative embodiment, the copolyester may comprise the condensation product of the following monomers: isophthalic acid, a sulfomonomer containing an alkali metal sulfonate group attached to a dicarboxylic aromatic nucleus and an alkylene glycol with about 2 to about 11 carbon atoms. Optionally, an aliphatic dicarboxylic acid of the formula $HOOC(CH_2)_n COOH$, where n is about 1 to about 11, can also be employed as a monomer therein. An optimal copolyester is made up of about 90 mol percent isophthalic acid, about 10 mol percent of the sodium salt of 5-sulfoisophthalic acid and about 100 mol percent ethylene glycol.

When the anti-static agent comprises a copolyester, the anti-static agent may be present in the coating composition such that the resulting coating contains the anti-static agent in an amount from about 10% to about 60% by weight, such as in an amount from about 20% to about 40% by weight, such as from about 25% to about 35% by weight.

In one embodiment, the anti-static agent is present in the coating composition in combination with at least one other component, such as a print enhancing agent, an adhesion promoter, a crosslinking agent, and/or an anti-slip agent.

Other suitable anti-static agents that may be incorporated into the composition include compounds or polymers capable of providing anti-static properties. The anti-static agent, for instance, may comprise a hygroscopic material, a conductive material, and/or an organometallic.

In one alternative embodiment, the anti-static agent comprises an organo titanate and/or an organo zirconate. For example, in one particular embodiment, the anti-static agent comprises an amino zirconate, a sulfonyl zirconate, or mixtures thereof. For example, the anti-static agent may comprise a mixture of an amino zirconate and a sufonyl zirconate.

Anti-static agents that may be used in the composition include a combination of compounds having the following formulas:

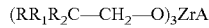

$(RR_1R_2C-CH_2-O)_3ZrA$

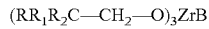

$(RR_1R_2C-CH_2-O)_3ZrB$ wherein R, $R_1$, $R_2$ are each a monovalent alkyl, alkenyl, alkynyl, aralkyl, aryl or alkaryl group having up to 20 carbon atoms or a halo- or ether-substituted derivative thereof; and A is either an oxyalkylamino $-(-O-R_4-N(R_5)(R_6))$ or an oxyaryl amino $-(-OArN(R_5)(R_6))$ group, and B is a arylsulfonyl $(ArS(O)_2-O)-$ or an alkyl sulfonyl $(R-S(O)_2O-)$ group.

The various R, $R_1$, and $R_2$ may each contain up to three ether oxygen or halogen substituents, provided the total number of carbon atoms for each such R group does not exceed 20, inclusive of the carbon atoms contained in substituent portions. Preferably, the R group in the alkyl sulfonyl group contains from 1 to 8 carbon atoms.

$R_4$ is a divalent alkylene group which many contain in the chain oxygen and nitrogen atoms, e.g., a-$C_2H_4NHC_2H_4$- group.

$R_5$ and $R_6$ may be hydrogen or hydrocarbyl groups as defined for R, $R_1$ and $R_2$ above. Preferably, $R_5$ and $R_6$ are hydrogen, i.e., the terminal amino group has primary functionality as opposed to secondary or tertiary.

Ar, in the above formulas, may be a monovalent aryl or alkaryl group having from 6 to about 20 carbon atoms, optionally containing up to 3 ether oxygen substituents, and substituted derivatives thereof wherein the substitutions are up to a total of three halogens or amino groups having the formula $NR_8R_9$ wherein $R_8$ and $R_9$ are each hydrogen, an alkyl group having 1 to 12 carbon atoms, an alkenyl group having from 2 to 8 carbon atoms, a cycloalkyl group having from 3 to 12 carbon atoms, and an aryl group having from 6 to 12 carbon atoms, Preferably Ar is a phenylene group having a long chain alkyl substitution having from 8 to 18 carbon atoms.

In one embodiment, the anti-static agent may comprise:

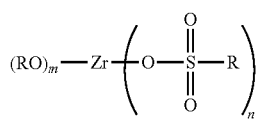

and/or

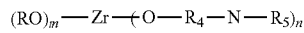

$(RO)_m-Zr-(-O-R_4-N-R_5)_n$ where m+n=4.

In one particular embodiment, the above two compounds may be combined together and added with an ethoxylated nonyl phenol and dimethyl amino ethoxyethanol.

The anti-static agent may comprise a combination of a trineoalkoxy amino zirconate compound with a trineoalkoxy sulfonyl zirconate compound.

When the anti-static agent comprises an organometallic, such as a zirconate, the anti-static agent may be present in the coating composition such that the resulting coating contains the anti-static agent in an amount from about 10% to about 35% by weight, such as in an amount from about 15% to about 30% by weight, such as in an amount from about 15% to about 20% by weight.

In addition to one or more anti-static agents, the coating composition may also include metal oxide particles, and particularly metal oxide nanoparticles. In particular, the metal oxide particles can have a size of less than 1 micron. For instance, the nanoparticles may have a particle size or average diameter of less than about 20 nanometers, such as less than about 10 nanometers. The average particle size may be determined using transmission electron microscopy. In general, the average particle size is greater than about 0.5 nanometers, such as greater than about 1 nanometer. The nanoparticles may be made from any suitable non-reactive material. For instance, the nanoparticles may be made from an oxide. Examples of nanoparticles include silica particles or alumina particles.

In one embodiment, nanoparticles are used in which at least 90%, such as 100% of the particles have an average particle size of less than about 10 nanometers, such as less than about 8 nanometers, such as even less than about nanometers. In general, at least 90% of the nanoparticles have an average particle size of greater than about 0.5 nanometers, such as greater than about 1 nanometer. The particles can have a surface area of greater than about 300 $m^2/g$, such as greater than about 500 $m^2/g$. In one embodiment, for instance, the surface area of the nanoparticles can be from about 500 $m^2/g$ to about 1000 $m^2/g$, such as from about 600 $m^2/g$ to about 800 $m^2/g$.

In one embodiment, the nanoparticles are added as a dispersion having a relatively high pH, such as greater than about 7, such as greater than about 10. The pH is generally less than about 14, such as less than about 12.

The presence of the metal oxide particles can provide various different advantages and benefits. For instance, the metal oxide particles can lower water contact angles making the coated film better for printing and reduce the gloss level.

The metal oxide particles are present in the coating composition such that the dried coating contains the particles in an amount from about 20% to about 40% by weight, such as in an amount from about 25% to about 35% by weight.

The coating composition can also contain a print enhancing agent. The print enhancing agent may comprise any suitable polymer capable of increasing the adhesion of pigments, inks and toner to the coated film. In one embodiment, the print enhancing agent may comprise a vinyl ether, such as poly(vinyl methyl ether) and/or poly(vinyl ethyl ether).

Other print enhancing agents that may be used include various hydrophilic polymers such as polyvinylpyrrolidone and vinylpyrrolidone-containing copolymers, polyethyloxazoline and oxazoline-containing copolymers, imidazole-containing polymers, polyacrylamides and acrylamide-containing copolymers, poly(vinyl alcohol) and vinyl-alcohol-containing copolymers, poly(alkylene oxides), gelatin, cellulose ethers, poly(vinylacetamides), partially hydrolyzed poly(vinyl acetate/vinyl alcohol), poly(acrylic acid), sulfonated or phosphated polyesters and polystyrenes, casein, albumin, chitin, chitosan, dextran, pectin, collagen derivatives, collodian, agar-agar, arrowroot, guar, carrageenan, tragacanth, xanthan, rhamsan, gum arabic and the like.

The print enhancing agent may also contain a cellulose derivative. Cellulose derivatives include, for instance, carboxymethyl cellulose, carboxyethyl cellulose, methyl cellulose, and mixtures thereof.

In one embodiment, the print enhancing agent may comprise a combination of two or more of the above polymers.

The print enhancing agent may be present in the coating composition in an amount such that the resulting dried coating contains the print enhancing agent in an amount from about 10% to about 30% by weight, such as from about 15% to about 25% by weight. When the anti-static agent comprises a copolyester, the print enhancing agent may be present in an amount from about 10% to about 35% by weight, such as in an amount from about 15% to about 35% by weight.

The coating composition can further contain an adhesion promoter. In one embodiment, for instance, the adhesion promoter may comprise an alkylene and acrylic acid copolymer or an alkylene and methacrylic acid copolymer. For instance, in one embodiment, the adhesion promoter comprises an ethylene acrylic acid copolymer. The ethylene acrylic acid copolymer may contain an acrylic acid comonomer in an amount less than about 20% by weight, such as in an amount less than about 18% by weight, such as in an amount less than about 16% by weight. The acrylic acid comonomer contained in the ethylene acrylic acid copolymer may generally be present in an amount greater than about 4% by weight, such as in an amount greater than about 8% by weight, such as in an amount greater than about 10% by weight.

The adhesion promoter may be present in the coating composition in an amount such that the dried coating contains the adhesion promoter in an amount from about 20% to about 40% by weight, such as in an amount from about 25% to about 35% by weight. When an anionic anti-static agent is present such as a copolyester, the adhesion promoter may be present in the dried coating in an amount from about 20% to about 55% by weight, such as in an amount from about 30% to about 50% by weight.

In one embodiment, optionally, a crosslinking agent may also be incorporated into the coating composition. The crosslinking agent can crosslink any polymers contained in the coating composition. In one embodiment, for instance, a crosslinking agent may be added that causes the adhesion promoter to crosslink. Crosslinking one or more polymers within the coating increases the resistance of the coating to forming dust particles, especially when the coating is brought into contact with machinery, such as guide rollers or other components of a digital printer.

In general, any suitable crosslinking agent may be incorporated into the composition. In one embodiment, for instance, a melamine crosslinker may be used. For instance, the melamine crosslinking agent may comprise hexamethoxymethylmelamine. When present, the crosslinking agent may be added to the coating composition such that the dried coating contains the crosslinking agent in an amount less than about 5% by weight, such as in an amount less than about 4% by weight. In general, the crosslinking agent is added in an amount greater than about 0.1% by weight, such as in an amount greater than 0.5% by weight. In one embodiment, a crosslinking agent may be added in an amount from about 1% to about 5% by weight, such as from about 2% to about 4% by weight.

Optionally, the coating composition may contain various other ingredients. For instance, the coating composition may comprise an anti-slip agent comprising particles having a particle size of from about 1 micron to about 10 microns. For instance, in one embodiment, an anti-slip agent is present in the coating that comprises polymethylmethacrylate particles. The particles may be present in the coating in an amount from about 0.5% to about 3% by weight.

Other ingredients that may be present in the coating composition include colorants such as pigments, stabilizers, antioxidants, delusterants, plasticizers, and the like.

The coating composition may be formulated as a dispersion in water or in a water-contained solvent. Alternatively, alcohols or other suitable organic solvents can be employed, alone or in combination with water. The solids level of the coating composition can be up to about 50% by weight, such as from about 1% by weight to about 30% by weight, and particularly from about 5% by weight to about 20% by weight.

The coating composition can be applied to any suitable polymer film. The coated film can be used in numerous applications. The coated film, however, is particularly well suited for receiving images and lettering, especially when applied using a digital printer, such as a laser printer or inkjet printer.

When the polymer film is used to receive graphics, in one embodiment, the polymer film may include a white pigment such that the polymer film has a white matte appearance. The white pigment can be, for instance, titanium oxide, barium sulfate, magnesium oxide, calcium carbonate, and the like. The average particle size of the white pigment can be from about 0.05 microns to about 1 micron, such as from about 0.1 microns to about 0.5 microns. The amount of white pigment added to the film layer can be from about 1% to about 25% by weight, such as from about 5% to about 20% by weight.

The coating composition of the present disclosure can be applied to one side of a film layer or can be applied to both sides of a film layer. When applied and dried, the coating can have a thickness of from about 80 nm to about 280 nm, such as from about 130 nm to about 160 nm.

As mentioned above, the film layer can be made from any suitable polymer. For example, the present invention is applicable to polymeric films such as those made from polyamides exemplified by nylon; polyolefins such as polypropylene and polyethylene; polyester such as polyethylene terephthalate; polyacetal; polycarbonate; and the like. The invention is particularly applicable to polyester, most preferably polyethylene terephthalate, polyethylene naphthalate or polybutylene terephthalate. The present invention is also applicable to polymeric films including copolyesters such as polyethylene terephthalate isophthalate. A preferred process for forming a base film is set forth in U.S. Pat. No. 5,350,601 to Culbertson et al., incorporated herein by reference. Generally, any polyester film based on a polymer resulting from polycondensation of a glycol or diol with a dicarboxylic acid (or its ester equivalents) such as terephthalic acid, isophthalic acid, sebacic acid, malonic, adipic, azelaic, glutaric, suberic, succinic acids and the like, or mixtures of two or more of the foregoing, are preferred for use in the present invention. Suitable glycols include ethylene glycol, diethylene glycol, polyethylene glycol, and polyols such as butanediol and the like. Mixtures of two or more of the foregoing are also suitable.

Any of the above base polymer films can contain conventional additives such as antioxidants, delusterants, pigments, fillers such as silica, calcium carbonate, kaolin, titanium dioxide, and the like, or mixtures thereof, all of which are well known in the art.

In addition, the base polymer film may be a polymer laminate. Such laminates include polymer-polymer laminates like polyester-polyolefin or polyester-adhesive-polyolefin, polymer-metallic laminates such as polyester-aluminum, or polymer-paper or polymer-adhesive-paper laminates.

The base film may be a clear film, white film, matte film, voided film, colored film, and the like, all of which are well known in the art.

The films may be produced by any well known technique in the art. For example, polyester is typically melted and extruded as an amorphous sheet onto a polished revolving casting drum to form a cast sheet of the polymer. The sheet is quickly cooled and then stretch oriented in one or more directions to impart strength and toughness to the film. The sheet is typically stretched from about two to about four times the original cast sheet dimension, in one or both directions. Biaxial orientation is most preferred, with monoaxial orientation being less preferred. Generally, stretching occurs in a temperature range from about the second order transition temperature of the polymer to below the temperature at which the polymer softens and melts. Where necessary, the film is heat treated after stretching to "lock-in" the properties by further crystallizing the film. The crystallization imparts stability and good tensile properties to the film. Such heat treatment for polyester film is generally conducted at about 190° C. to about 240° C.

Coating Methods

The coating of the base polymer layer can occur in-line in one embodiment. The coating can be applied during the film manufacturing process and before it is heat-set. The base polymer film can be coated after corona treatment and prior to the stretch orientation of the film. The film can be coated between drawing steps (when biaxially oriented film is produced) or coated post-draw.

In addition to in-line coating, one or more of the coatings of the present invention may be off-line coated (after manufacturing and heat setting the film), preferably after conventional surface modification of the polymeric substrate has occurred. Thus, the coating and method of the present invention are also intended for use where, for example, the base polymer film is produced and later coated off-line with one or more coatings of the present invention. Alternatively, one or more coatings can be applied in-line, with the remainder being applied off-line. Conventional off-line coating processes include roll coating, reverse roll coating, gravure roll coating, reverse gravure roll coating, brush coating, wire-wound rod (Meyer rod) coating, spray coating, air knife coating, meniscus coating or dipping.

Once the coating is applied to the film layer, as described above, the coating imparts various unique properties and characteristics to the film. The coating, for instance, adds great mechanical strength and adhesion to the film layer and consequently does not generate dust particles during use, especially during printing processes. Further, the coating has excellent anti-static properties and excellent printing properties. The coating is also engineered to be very receptive to any suitable pigment composition, such as any suitable ink or toner.

The present disclosure may be better understood with reference to the following examples.

Example No. 1

The following coating composition was formulated and applied to a polyester film. In the coating composition, the copolyester resin comprised a water-soluble copolyester comprising 1,3-benzenedicarboxylic acid, 5-sulfo-, 1,3-dimethyl ester sodium salt, polymer and dimethyl 1,4-benzenedicarboxylate, 1,2-ethanediol and 2,2'-oxybis(ethanol).

| Component | Solids Content |
|---|---|
| Sulphonated copolyester resin | 3.75% |
| Polyvinyl methyl ether | 3.00% |
| Ethylene acrylic acid copolymer ammoniated dispersion | 5.25% |
| Hexamethoxymethylmelamine | 0.31% |
| Polymethylmethacrylate particles having an average particle size of 6 microns | 0.19% |
| Water | — |

Total solids content 12.5%

The above coating composition was applied to each side of a polyester film while the polyester film was being produced to provide better anti-static and/or anti-dusting properties. In particular, the coating composition was applied to the film as the film was being biaxially stretched. The polyester film comprised a polyethylene terephthalate film having a final thickness of about 50 to 175 microns.

The dried coating contained the components in the following amounts.

| Component | Weight Percent |
|---|---|
| Sulphonated copolyester resin | 30% |
| Polyvinyl methyl ether | 24% |
| Ethylene acrylic acid copolymer ammoniated dispersion | 42% |
| Hexamethoxymethylmelamine | 2.5% |
| Polymethylmethacrylate particles having an average particle size of 6 microns | 1.5% |

The coating was found to be scratch resistant. The coated film was inserted into a digital printer and the coating was found to adhere perfectly to the toner.

Example No. 2

The following coating composition was formulated and applied to a polyester film.

| Component | Solids Content |
|---|---|
| Sulphonated copolyester resin | 2.25% |
| Colloidal silica nanoparticles | 3.75% |
| Polyvinyl methyl ether | 2.38% |
| Ethylene acrylic acid copolymer ammoniated dispersion | 3.63% |
| Hexamethoxymethylmelamine | 0.31% |

| Component | Solids Content |
| --- | --- |
| Polymethylmethacrylate particles having an average particle size of 6 microns | 0.19% |
| Water | — |

Total solids content 12.5%

The above coating composition was applied to each side of a polyester film while the polyester film was being produced to provide better anti-static and/or anti-dusting properties. In particular, the coating composition was applied to the film as the film was being biaxially stretched. The polyester film comprised a polyethylene terephthalate film having a final thickness of about 50 to 175 microns.

The dried coating contained the components in the following amounts.

| Component | Weight Percent |
| --- | --- |
| Sulphonated copolyester resin | 18% |
| Colloidal silica nanoparticles | 30% |
| Polyvinyl methyl ether | 19% |
| Ethylene acrylic acid copolymer ammoniated dispersion | 29% |
| Hexamethoxymethylmelamine | 2.5% |
| Polymethylmethacrylate particles having an average particle size of 6 microns | 1.5% |

The surface conductivity was zero at 100 volts and at 500 volts using a Keithly Model 6487 Picoammeter. The coating was found to be scratch resistant. The coated film was inserted into a digital printer and the coating was found to adhere perfectly to the toner.

Example No. 3

The following coating composition was formulated and applied to a polyester film.

| Component | Solids Content |
| --- | --- |
| Mixture of amino zirconate and sulfonyl zirconate | 2.25% |
| Colloidal silica nanoparticles | 3.75% |
| Polyvinyl methyl ether | 2.38% |
| Ethylene acrylic acid copolymer ammoniated dispersion | 3.63% |
| Hexamethoxymethylmelamine | 0.31% |
| Polymethylmethacrylate particles having an average particle size of 6 microns | 0.19% |
| Water | — |

Total solids content 12.5%

The above coating composition was applied to each side of a polyester film while the polyester film was being produced to provide better anti-static properties. In particular, the coating composition was applied to the film as the film was being biaxially stretched. The polyester film comprised a polyethylene terephthalate film having a final thickness of about 50-175 microns.

The dried coating contained the components in the following amounts.

| Component | Weight Percent |
| --- | --- |
| Mixture of amino zirconate and sulfonyl zirconate | 18% |
| Colloidal silica nanoparticles | 30% |
| Polyvinyl methyl ether | 19% |
| Ethylene acrylic acid copolymer ammoniated dispersion | 29% |
| Hexamethoxymethylmelamine | 2.5% |
| Polymethylmethacrylate particles having an average particle size of 6 microns | 1.5% |

Example No. 4

The coating composition described in Example Nos. 1, 2 and 3 were applied to a polyester film and fed through a Xeikon digital printer and printed with dry toner. Two other coated polyester films were also fed through the digital printer in a similar manner for purposes of comparison. Instead of containing a zirconate, one of the comparative films had a coating containing stearamidopropyldimethyl-2-hydroxyethylammonium nitrate as an anti-static agent. The second comparative film included a coating containing tetramethyl ammonium fluoride as an anti-static agent.

All five films were subjected to a printing test, scratch test and to an adhesion test. The coated films made in accordance with the present disclosure displayed significantly less scratching after being tested. In order to test adhesion, the films were tape tested after printing. The coated films of the present disclosure displayed excellent adhesion properties to the toner. In fact, no printed toner peeled off of the films after the tape test. In comparison, toner peeled away from the two comparative films. The film made from Example No. 1 showed the best printability, antistatic and anti-powdering properties after running through Xeikon machine.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A coated film having anti-static and/or anti-dusting properties comprising:
    a base film having a first side and a second side; and
    a coating on at least the first side of the film, the coating comprising:
        an anti-static agent comprising a copolyester; and
        a print enhancing agent comprising a vinyl ether, and
        an adhesion promoter comprising an alkylene and acrylic acid copolymer; and
    wherein the coating is free of polymeric antistatic agents other than the copolyester.

2. A coated film as defined in claim 1, further comprising a crosslinking agent and/or polymethylmethacrylate particles.

3. A coated film as defined in claim 1, wherein the anti-static agent is present in the coating in an amount from about 20% to about 40% by weight, the coating further comprising:
    the print enhancing agent present in the coating in an amount from about 10% to about 35% by weight;

a crosslinking agent; and
the adhesion promoter present in the coating in an amount from about 20% to about 55% by weight.

4. A coated film as defined in claim 3, wherein the print enhancing agent comprises a polyvinyl methyl ether, the print enhancing agent being present in the coating in an amount from about 15% to about 30% by weight; and
wherein the adhesion promoter comprises an ethylene acrylic acid copolymer, the adhesion promoter being present in the coating in an amount from about 30% to about 50% by weight.

5. A coated film as defined in claim 3, wherein the crosslinking agent comprises a melamine, the crosslinking agent being present in the coating in an amount from about 1% to about 5% by weight.

6. A coated film as defined in claim 1, wherein the anti-static agent comprises a water-soluble copolyester comprising 1,3-benzenedicarboxylic acid, 5-sulfo-, 1,3-dimethyl ester sodium salt, polymer and dimethyl 1,4-benzenedicarboxylate, 1,2-ethanediol and 2,2'-oxybis(ethanol).

7. A coated film as defined in claim 1, wherein the anti-static agent is anionic.

8. A coated film as defined in claim 1, further comprising polymethylmethacrylate particles having an average particle size of from about 1 micron to about 10 microns, the polymethylmethacrylate particles being present in the coating in an amount from about 0.5% to about 3% by weight.

9. A coated film as defined in claim 1, wherein the coating is also on the second side of the base film.

10. A coated film as defined in claim 1, wherein the base film contains a white pigment and wherein the white pigment comprises titanium dioxide, barium sulfate, magnesium oxide, calcium carbonate, or mixtures thereof, the white pigment being present in the base film in an amount from about 5% to about 30% by weight, the white pigment having an average particle size of from about 0.05 microns to about 0.5 microns.

11. A coated film as defined in claim 1, wherein the base film comprises a polyester film, that has been biaxially stretched.

12. A coated film as defined in claim 1, wherein the coating has a thickness of from about 130 nm to about 200 nm.

13. A coated film as defined in claim 1, wherein the first side of the base film after being coated has a surface conductivity of zero.

14. A coated film as defined in claim 1, wherein the base film comprises a clear film.

15. A coated film as defined in claim 1, wherein the base film comprises a matte film, a voided film, or a colored film.

16. A process for producing a coated film comprising:
applying a coating composition according to claim 1 to a film layer; and
stretching the film layer and drying the coating.

17. A process as defined in claim 16, wherein the anti-static agent comprises a water-soluble copolyester comprising 1,3-benzenedicarboxylic acid, 5-sulfo-, 1,3-dimethyl ester sodium salt, polymer and dimethyl 1,4-benzenedicarboxylate, 1,2-ethanediol and 2,2'-oxybis(ethanol); and
wherein the print enhancing agent comprises a polyvinyl methyl ether; and
wherein the adhesion promoter comprises an ethylene acrylic acid copolymer; and
wherein the coating composition is applied to both sides of the film layer and dried while the film is stretched.

18. The coated film as defined in claim 1, further comprising polymethylmethacrylate particles, wherein the polymethylmethacrylate particles are present in the coating in an amount from about 0.5% to about 3% by weight.

19. The coated film as defined in claim 1, wherein the print enhancing agent comprises poly(vinyl methyl ether) or poly(vinyl ethyl ether).

20. A coated film having anti-static properties comprising:
a base film having a first side and a second side; and
a coating on at least the first side of the film, the coating comprising:
a first anti-static agent, the first anti-static agent being a zirconate or a mixture of zirconates, the first anti-static agent being present in the coating in an amount from about 10% to about 35% by weight; and
metal oxide particles having an average particle size of less than about 50 nanometers, the metal oxide particles being present in the coating in an amount from about 20% to about 40% by weight; and
wherein the coating is free of polymeric antistatic agents other than an optional copolyester.

21. A coated film as defined in claim 20, the coating further comprising:
a print enhancing agent present in the coating in an amount from about 10% to about 30% by weight;
a crosslinking agent; and
an adhesion promoter present in the coating in an amount from about 20% to about 40% by weight.

* * * * *